United States Patent [19]

Mayer

[11] 4,246,973
[45] Jan. 27, 1981

[54] CONTROLS FOR HYDRAULIC PERCUSSION DRILL

[75] Inventor: James R. Mayer, Englewood, Colo.

[73] Assignee: Cooper Industries, Inc., Houston, Tex.

[21] Appl. No.: 871,289

[22] Filed: Jan. 23, 1978

[51] Int. Cl.³ .............................................. B23Q 5/00
[52] U.S. Cl. .......................................... 173/8; 173/9; 173/11
[58] Field of Search ................................ 173/2, 4-12

[56] References Cited

U.S. PATENT DOCUMENTS

| | | | |
|---|---|---|---|
| 2,804,751 | 9/1957 | Schroeder | 173/8 |
| 3,561,542 | 2/1971 | Hanson et al. | 173/5 |
| 3,823,784 | 7/1974 | Feucht | 173/11 |
| 3,995,700 | 12/1976 | Mayer et al. | 173/2 |
| 4,023,626 | 5/1977 | Salmi et al. | 173/8 |
| 4,062,411 | 12/1977 | Adkins et al. | 173/115 |
| 4,068,728 | 1/1978 | Subrick | 173/27 |
| 4,074,771 | 2/1978 | Morrison | 173/11 |

Primary Examiner—Lawrence J. Staab
Attorney, Agent, or Firm—Michael E. Martin

[57] ABSTRACT

A control system for a hydraulic percussion rock drill and feed mechanism including a single constant power hydraulic pump for supplying pressure fluid to operate the feed mechanism, drill stem rotation motor, and the percussion hammer. The drill feed, rotation and percussion functions are controlled by individual manually actuated pressure compensated valves. Fluid pressure to the feed mechanism is controllable at one of two selectable pressures and is automatically reduced if fluid pressure to the drill stem rotation motor exceeds a predetermined limit. The drill percussion blow intensity and frequency is controlled by a mechanism responsive to a fluid pressure signal which is automatically operated to provide for a high blow frequency and low blow intensity operating mode when the drill is retracted away from the workface. The constant power hydraulic pump is provided with a control which will adjust the pump output to a partial displacement setting when the drill is being retracted away from the workface. Alternatively, the pump control may be set to full displacement with a power limit and the drill percussion mechanism fluid supply may be automatically throttled when the drill is being retracted away from the workface.

17 Claims, 5 Drawing Figures

CONTROLS FOR HYDRAULIC PERCUSSION DRILL

BACKGROUND OF THE INVENTION

Hydraulic percussion rock drills have been developed which provide for substantially all drill functions, except drill hole flushing, to be performed by hydraulic pressure fluid. Drill percussion mechanisms as well as drill stem rotation motors and feed motors are desirably hydraulically powered for greater efficiency for deriving more power from a smaller machine than has been possible with pneumatic powered drills. The development of hydraulic percussion drills has, however, resulted in more complex control circuits due to the fact that hydraulic fluid return lines must be provided and, heretofore, it has been deemed desirable to use multiple pumps for supplying pressure fluid to the various motors on the drill and the associated feed mechanism. Moreover, the more powerful hydraulic drills have made it more desirable that the relationship of feed force, drill stem rotation effort, and percussive energy should be controlled to provide optimum drilling rates. However, the automatic control of each of these functions becomes difficult and requires expensive components when multiple hydraulic circuits are used.

The development of hydraulic percussion drills has further resulted in the desire to provide even greater drilling rates by the use of controls to vary the percussion blow intensity and blow frequency to suit the particular drilling conditions. Improvements in such controls as well as the provision of a hydraulic percussion drill powered by a constant power hydraulic source is the subject of the invention disclosed and claimed in U.S. Pat. No. 3,995,700 assigned to the assignee of the present invention.

In the further development of percussion drills having variable percussion blow frequency controls it has been determined that it is desirable to vary blow frequency and blow intensity in relation to resistance to forward feeding of the drill and also in relation to resistance to rotation of the drill stem and bit. Moreover, it is considered desirable that on retraction of the drill from the work that blow intensity be decreased to prevent possible damage to the percussion mechanism.

The problems associated with prior control systems for hydraulic drills as well as certain improvements foreseen as being desirable in the art of hydraulic percussion drills have been dealt with in developing the invention disclosed and claimed herein.

SUMMARY OF THE INVENTION

The present invention includes an improved control system for the supply of pressure fluid to a hydraulic percussion rock drill and associated feed mechanism which control system is uncomplicated and yet provides control of the drill percussion motor, drill stem rotation motor, drill feed mechanism, and includes automatic control of the percussion blow frequency, feed force, and feed direction.

The present invention also provides for a hydraulic percussion rock drill and associated feed mechanism which is supplied with hydraulic pressure fluid from a single hydraulic pump. The pump is desirably of the variable displacement type with controls for providing constant hydraulic power to the drill and the feed mechanism. Control valves for operating the percussion motor, the drill stem rotation motor, and the feed mechanism include manually actuatable valves which are operable to provide flow to the various motors proportional to valve position regardless of variations in supply pressure.

The present invention further provides for a control system for a hydraulic percussion drill with variable blow frequency control wherein blow frequency may be automatically increased in proportion to a decrease in feed pressure or feed force on the drill bit and wherein feed force is decreased in proportion to an increase in resistance to rotation of the drill stem and bit. Accordingly, drill feed force and blow frequency may be automatically varied to provide for maximum penetration rates of the drill.

The control system of the present invention still further provides for automatic control of a variable displacement pump to operate at reduced capacity on startup of the drill and to automatically increase to the maximum volume displacement setting of the pump control when drill feed pressure is increased a predetermined amount. Accordingly, improved hole starting or "collaring" may be accomplished without manual adjustment of the drill percussion motor control or the percussion blow frequency.

DESCRIPTION OF THE PREFERRED EMBODIMENTS

Figure 1:
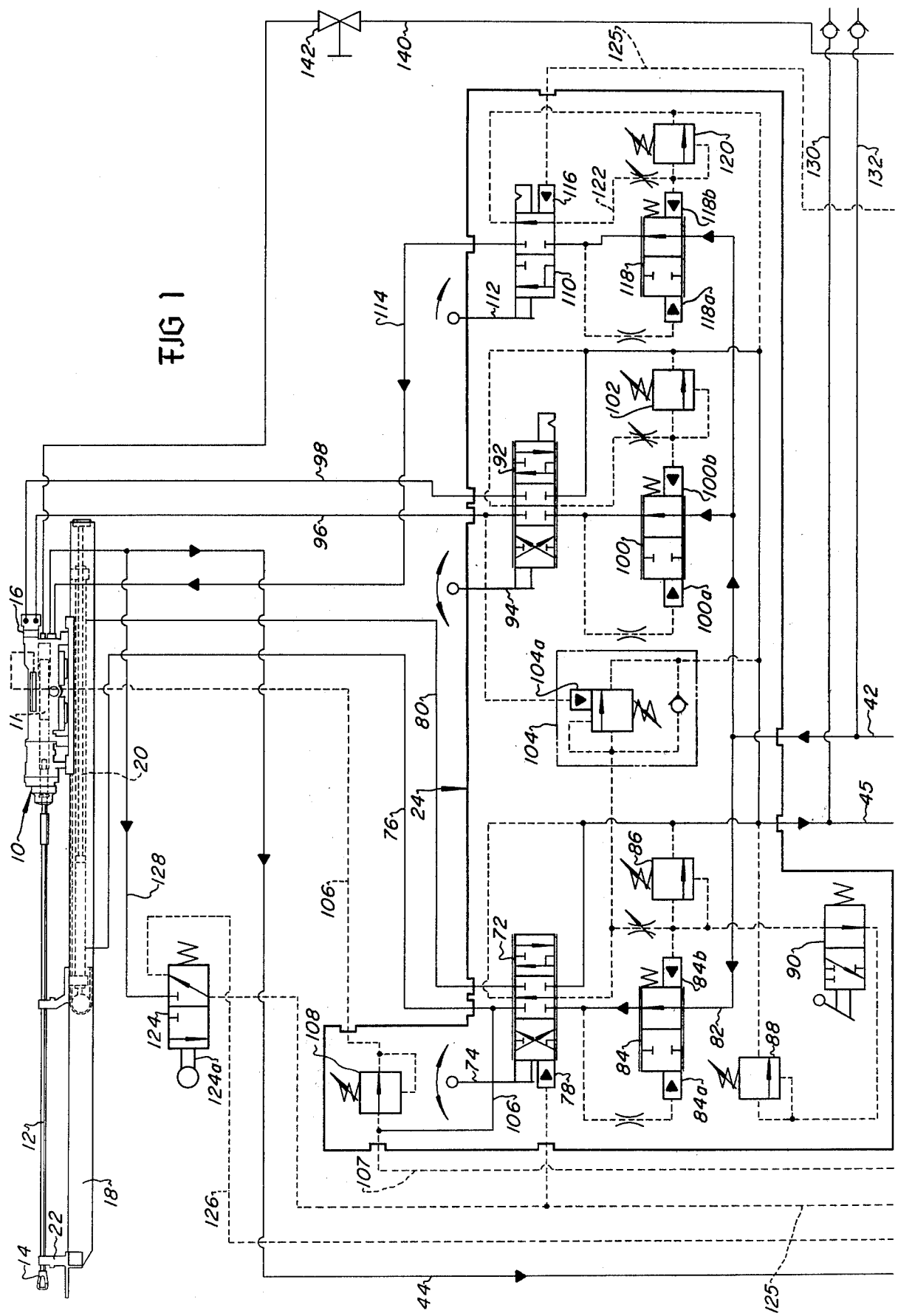
FIG. 1 is a portion of a schematic diagram of the control system of the present invention.
Figure 2:
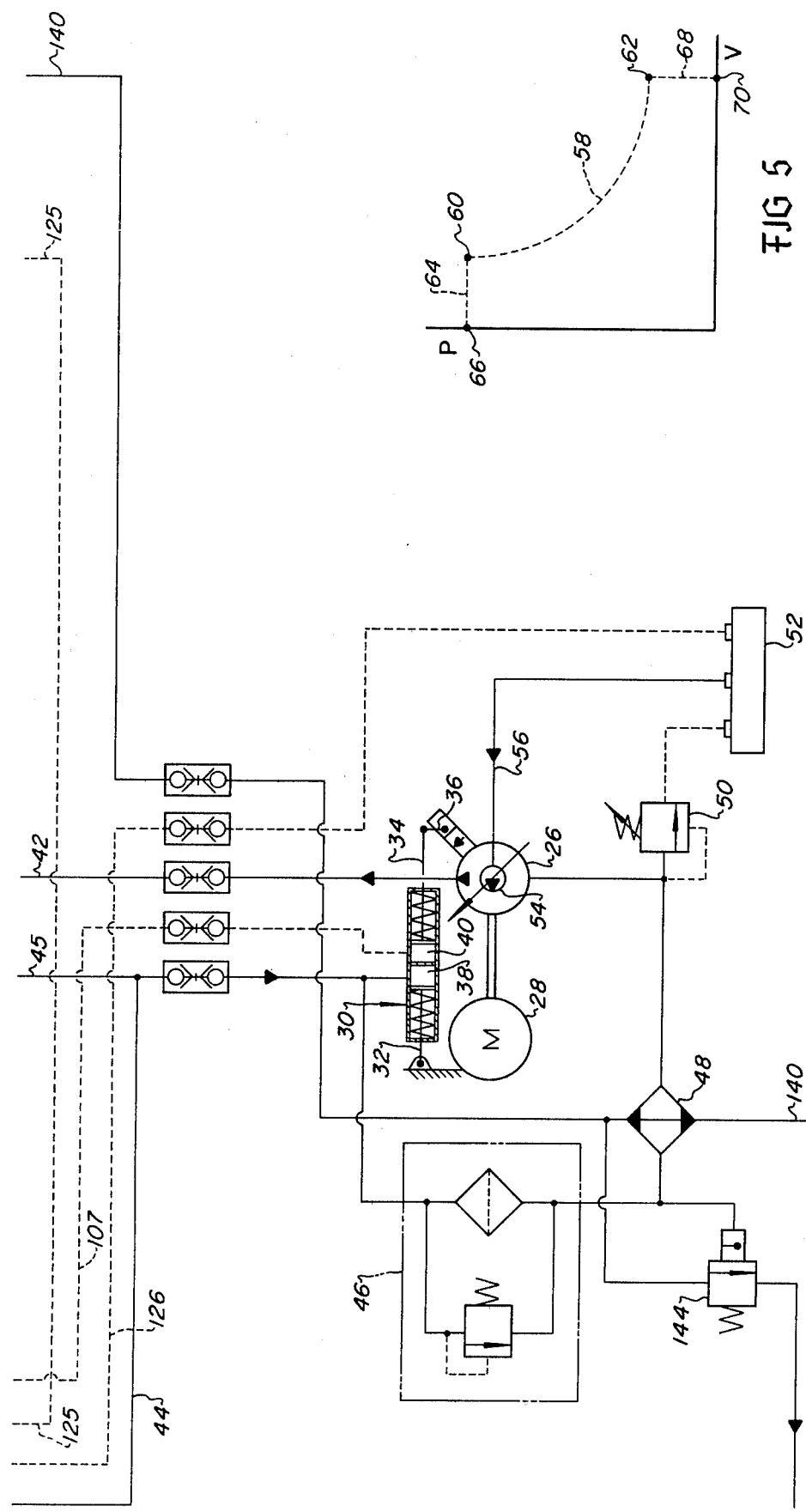
FIG. 2 is a further portion of the diagram shown in FIG. 1.

Referring to FIG. 1 the schematic diagram shown is intended to be read in conjunction with the diagram shown in FIG. 2. Lines representing fluid conduits in one figure and which have the same reference characters as lines in the other figure are intended to be regarded as continuations of the same conduits.

In FIG. 1 a hydraulic percussion rock drill is shown schematically and is generally designated by the numeral 10. The drill 10 is generally characterized as having a percussion motor including a reciprocating piston hammer 11 which is oscillated by high pressure hydraulic fluid to deliver repeated impact blows to a drill stem 12 having a percussion bit portion 14. The drill 10 includes suitable mechanism, not shown, for varying the impact blow frequency and blow intensity delivered to the drill stem. The drill 10 may be one of several embodiments of hydraulic percussion drills which are adapted for variable blow frequency operation. Examples of such drills which will operate suitably with the control system of the present invention are disclosed in U.S. Pat. Nos. 3,995,700 and 4,062,411 which are intended to be incorporated by reference in the disclosure of the present invention. The drill 10 also includes a pressure fluid operated motor 16 for rotatably driving the drill stem 12 in a known way by means of suitable transmission mechanism, not shown. The motor 16 is preferably a reversible positive displacement gear, vane or piston type motor. The drill 10 is adapted to be mounted on an elongated feed bar 18 for reversible movement therealong in response to operation of a suitable feed mechanism. In the illustrated embodiment the feed mechanism may comprise an elongated hydraulic cylinder and piston motor 20 which is operable to be extended to pull the drill along the feed bar toward a drill stem guide 22. The cylinder and piston type feed motor 20 is of the double acting or reversible type. The feed motor 20 may be directly connected to the drill 10 or by way of suitable linkage such as chain or cables. The control system of the present invention may be also used with other feed mechanisms which are operated by other types of reversible hydraulic motors. The feed bar may, of course, be mounted on a suitable boom or other support for being positioned near a rock face.

The drill 10 and associated feed mechanism are adapted to be operated by an improved control system which includes a plurality of elements arranged to be mounted on an operator's control panel which is schematically represented by the enclosure 24. Referring to FIG. 2 the control system of the present invention includes a source of hydraulic pressure fluid comprising a hydraulic pump 26 which is adapted to be driven at substantially constant speed by a motor 28. The pump 26 is desirably of the variable displacement type which includes suitable controls which at constant speed provide for delivery of hydraulic pressure fluid at variable pressure and volume flow rate to maintain a constant power output within the limits of displacement and pressure capability of the pump. Pumps of the general type represented schematically in FIG. 2 are commercially available. One particular type of pump is that referred to in U.S. Pat. No. 3,995,700. Another suitable type of pump is a variable volume axial piston pump manufactured by Denison Division, Abex Corporation, Columbus, Ohio, U.S.A. The displacement of the pump 26 may be controlled by a servomechanism comprising a double cavity spring return hydraulic cylinder actuator 30. The actuator 30 includes a first piston rod 32 which is suitably fixed and a second piston rod 34 which is connected to the pump displacement control lever 36. In response to the introduction of pressure fluid into the cavity 38 the cylinder 30 and piston rod 34 move as a unit to move the pump displacement control from the minimum displacement position to approximately fifty percent of maximum displacement. When pressure fluid is also introduced into cavity 40 of the actuator 30 the piston rod 34 moves the pump displacement control to the full displacement condition. When the fluid pressure is relieved in the cavities 38 and 40 the actuator 30 moves the pump displacement control to the minimum displacement condition.

The control circuit shown in FIGS. 1 and 2 is a substantially closed loop system. Pump discharge flow is by way of conduit 42 and return flow is by way of conduits 44 and 45 which includes a filter 46, an oil cooler 48, and a pressure relief valve 50 which maintains system return flow at a minimum pressure greater than the pressure maintained in a reservoir 52. The pump 26 is provided with a charging pump 54 to maintain sufficient fluid in the system. The charging pump includes a suction line 56 which is connected to the reservoir 52 also.

Referring to FIG. 5 the operating characteristics of the pump 26 are shown by the diagram in which the abscissa of a graphical plot represents pump displacement volume V and the ordinate represents pump discharge pressure P. The line 58 represents a line of substantially constant fluid power output of the pump 26. The pump may operate along the line 58 between points 60 and 62 representing maximum discharge pressure and maximum displacement volume flow, respectively. The pump 26 may operate along a line 64 between points 60 and 66 if flow resistance downstream of the pump increases beyond the maximum operating pressure. The pump may also operate along a line 68 between points 62 and 70 if the flow resistance decreases at the maximum displacement volume of the pump.

Referring to FIG. 1 also, the control system of the present invention includes manually actuatable valves for controlling the flow of pressure fluid to the drill percussion motor, the rotation motor 16 and the feed motor 20. The feed motor 20 is controlled by a valve 72, which includes an operator controlled actuator 74 for supplying pressure fluid to a conduit 76 to cause the feed motor 20 to move the drill 10 forward or toward the guide 22. The valve 72 may be operated manually and also by a pilot actuator 78 to positions to supply pressure fluid to a conduit 80 for causing the feed motor 20 to move the drill 10 away from the guide 22. The valve 72 may also be positioned to block the flow of fluid to and from the conduits 76 and 80.

Pressure fluid is supplied to the feed control valve 72 by a conduit 82 which is connected to the high pressure supply conduit 42 of the pump 26. The feed control valve 72 also includes a pressure compensating valve 84, also known as a pressure differential balancing valve, which is arranged in the fluid circuit as shown in FIG. 1 to maintain a constant pressure decrease through the valve 72. In this way the fluid flow through the valve 72 to the feed motor 20 is dependent only on the set position of the valve actuator 74. The pressure compensating valve 84 senses fluid pressure upstream of the valve 72 at the actuator 84a and senses pressure downstream of the closure member of the valve 72 at the actuator 84b. Adjustable pressure relief valves 86 and 88 are also respectively operable to limit the maximum fluid pressure downstream of the closure member of the valve 72 by limiting the pressure acting on the valve actuator 84b. A manually actuated valve 90 is operable to close off communication of the pressure relief valve 88 with the valve actuator 84b. The pressure relief valve 88 is set at a lower maximum pressure than the pressure relief valve 86 and since the valve 90 is normally open the pressure relief valve 88 is effective to limit the maximum fluid pressure applied to the feed motor 20 to limit the feed force exerted on the drill. However, the forward as well as reverse feed pressure may be increased at will by actuating the valve 90 whereby the relief valve 88 becomes inoperative and the valve 86 controls the maximum fluid pressure to the feed motor 20.

A control valve 92 for controlling operation of the drill stem rotation motor 16 is similar to the feed control valve 72 except that it is not provided with a pilot pressure fluid actuator. The control valve 92 is provided with an operator controlled actuator 94 for moving the valve to respective positions wherein conduits 96 or 98 are supplied with pressure fluid for rotating the drill stem 12 in opposite directions. The valve 92 may also be placed in a center or neutral position in which both conduits 96 and 98 are blocked. The rotation motor control valve 92 also includes a pressure compensation valve 100 similar to the valve 84 which senses fluid pressure on the upstream and downstream sides of the closure member of the control valve to maintain a substantially constant pressure decrease across the closure member. The control circuit also includes an adjustable pressure relief valve 102 which is set to limit the maximum fluid pressure supplied to the conduits 96 or 98.

The control system of the present invention further includes a proportional pressure relief valve 104 which includes a pilot pressure fluid actuator 104a in communication with the conduit 96. The conduit 96 is supplied with pressure fluid from the control valve 92 to drive the drill stem rotation motor 16 in the direction which normally accompanies the operation of the drill 10 and feed mechanism 20 when drilling a hole.

The pressure relief valve 104 is operable to decrease the fluid pressure acting on the feed motor in proportion to an increase in fluid pressure supplied to the conduit 96 for all pressures greater than a predetermined limit pressure. Accordingly, when the drill 10 is operating to form a drill hole the valve 104 is operable to sense an increase in pressure in conduit 96, commensurate with an increase in resistance to rotation of the drill stem above a predetermined torque, to reduce the fluid supply pressure to the feed motor 20. In this way the feed rate may be controlled to prevent overfeeding the drill 10 and causing the bit to become jammed and the rotation motor stalled. By controlling the feed force in relation to the rotation of the drill stem, more efficient operation of the drill 10 including a faster hole formation rate may be achieved.

The drill 10 is provided with means for varying the blow frequency and blow intensity or energy per blow imparted to the drill stem as is disclosed in U.S. Pat. Nos. 3,995,700 and 4,062,411. The blow frequency control mechanism is controlled by a hydraulic pressure fluid signal which is supplied to the drill by way of a conduit 106 connected to the forward feed conduit 76. An operator controlled pressure reducing valve 108 is interposed in the conduit 106 for controlling the fluid pressure signal to the blow frequency control mechanism on the drill 10. With the particular mechanisms disclosed in the reference patents an increase in the pressure signal causes a higher blow intensity and a lower blow frequency. Decreasing the signal pressure in conduit 106 causes blow intensity to decrease and blow frequency to increase. The high frequency and low blow intensity operating mode is preferable for starting or "collaring" a new hole in a rock face. Moreover, the high blow frequency and low blow intensity operating mode is also less detrimental to the percussion hammer and drill stem when the feed force is reduced or feed direction is reversed. Accordingly, with the control system of the present invention the fluid pressure signal to the valve 108 is automatically reduced when the valve 72 is moved to connect the conduit 80 to the supply pressure and conduit 76 is connected to the fluid return conduit 45. Furthermore, when the drill 10 is operating in the forward feed mode and the feed pressure is reduced in conduit 76 as a result of operation of the valve 104, due to high resistance to drill stem rotation, the fluid pressure signal to the drill blow frequency control may be proportionally reduced. Therefore, drill stem rotation torque, feed force, blow frequency, and blow intensity are automatically maintained in a desired relationship to each other to provide for improved drill operating speed and efficiency.

The control system of the present invention still further includes a manually controllable valve 110 which has an operator controlled actuator 112 for moving the valve to conduct high pressure hydraulic fluid to the drill percussion motor by way of conduit 114. The valve 110 may also be moved to a position to block the flow of pressure fluid to conduit 114 by a pilot pressure fluid controlled actuator 116. The valve 110 further includes a pressure compensating valve 118 which is similar to the valves 84 and 100. A pressure relief valve 120 is in communication with the actuator 118b of valve 118 and the pilot control conduit 122 to limit the maximum pressure of fluid supplied to the drill percussion motor in the same manner that the valves 86 and 102 operate.

The valves 72, 92, and 110 and their respective associated pressure compensating or pressure differential balancing valves 84, 100, and 118 may be of a type which is commercially available. One such commercially available valve is a type MCV pressure compensated directional control valve manufactured by Hydraulic Products, Inc., Sturtevant, Wis., U.S.A.

The control system of the present invention provides means for automatically reversing the direction of feed of the drill along the feed bar 18 and for shutting off the flow of fluid to the drill percussion motor when the drill has reached a predetermined forward position along the feed bar. As shown in FIG. 1, a limit switch comprising a cam operated valve 124 is adapted to normally be in a position to connect conduit 125 and the valve actuators 78 and 116 with a low pressure conduit 126 leading to the reservoir 52. The valve 124 may be arranged on the feed bar 18 to be engaged by the drill 10 or otherwise be responsive to the drill reaching a forwardmost position along the feed bar whereby the valve is actuated to connect the conduit 128 with the conduit 125 and the pilot actuators 78 and 116. The conduit 128 is connected to the drill percussion motor fluid return conduit 44 which is maintained at a relatively low pressure by the charge pump 54 and the pressure relief valve 50. The pressure in the return conduit 44 is normally sufficient to actuate the cylinder 30 and the valve actuators 78 and 116. Once the valves 72 and 110 are moved to the respective reverse feed and fluid shutoff positions, they will remain in such positions until reset by the respective manual actuators 74 and 112 even though the valve 124 returns to the position for venting the actuators 78 and 116 when the drill moves away from the cam actuator 124a.

It has been determined in pursuing the present invention that a single hydraulic pump with a constant power control would be superior to multiple pump systems due to the simplification of the control circuits and the reduction in the cost of the complete system required for operating a drill and feed mechanism. It has also been determined that in normal drilling operations that the power required for operating the feed mechanism and drill stem rotation motor is subject to only minor variations regardless of drilling conditions. Morever, since it has been determined in pursuing the invention disclosed and claimed in U.S. Pat. No. 3,995,700 that a constant power pump is advantageous in combination with a variable frequency hydraulic percussion drill it then follows that it is necessary to provide a single pump with a system according to the present invention wherein the pump has sufficient power output capability to supply pressure fluid to the feed mechanism and the drill stem rotation motor as well as the drill percussion motor. In fact, the control systems of the present invention may also include conduits 130 and 132 for conducting pressure fluid to and from further mechanism, not shown, such as actuators for positioning the feed bar 18. Since the feed bar mounting or boom is not normally actuated while the drill is operating, the pump 26 may adequately supply pressure fluid to the boom positioning actuators, also.

In the operation of the control system of FIGS. 1 and 2 the control valves 72, 92 and 110 are normally in their respective closed positions when the pump 26 is started. Prior to startup of the pump 26 the displacement control lever 36 is normally set at the minimum pump discharge flow position because the cylinder chambers 38 and 40 are both at low pressure conditions. On starting of the pump, however, the return conduit 44 is pressurized by the charging pump 54 and the cylinder actuator 30 is moved to cause the pump control to be set at approximately fifty percent of maximum displacement. The feed control valve 72 is then partially opened to commence feeding the drill for collaring or starting the drill hole but pressure in the conduits 76, 106, and 107 is not sufficient to cause the cylinder actuator 30 to move the pump displacement control to full volume flow rate nor to cause the blow frequency control to reduce the blow frequency and increase blow intensity. The rotation motor control valve 92 and the drill percussion motor control valve 110 may then be fully opened to provide hydraulic fluid flow to the drill for operation at high blow frequency, fast drill stem rotation and moderate feed force to provide for easy starting of the drill hole.

When the drill hole is properly started the feed control valve 72 is fully opened which will cause a pressure increase in the conduit 76 and conduits 106 and 107 to cause the cylinder actuator 30 to move the pump displacement control to full volume with the automatic constant power control in effect. Increased pressure in the conduit 106 will bring the pressure regulator control valve 108 into operation to control the blow frequency and intensity at the predetermined condition set by the drill operator. The drill 10 will now operate under automatic control of fluid pressure to the feed motor 20, the rotation motor 16 and the drill percussion motor as disclosed previously herein. If the drill operator observes, in either the forward or reverse feed operating mode, that the feed pressure is insufficient the valve 90 may be manually actuated to close thereby causing the pressure relief valve 86 only to be effective to control the feed pressure.

When the drill 10 has reached the preset forward limit position and the cam operated valve 124 has been actuated, the feed control valve 72 is automatically moved to the reverse feed position and the valve 110 is moved to the closed position. The reduction in pressure in conduit 106 and the conduit 107 is sufficient to cause the cylinder actuator 30 to move the pump displacement control back to the fifty percent volume position. When the drill reaches the rearward end of the feed bar 18 the pump 26 will continue running in the pressure compensated condition until shutdown by suitable controls or by the drill operator.

Figure 3:
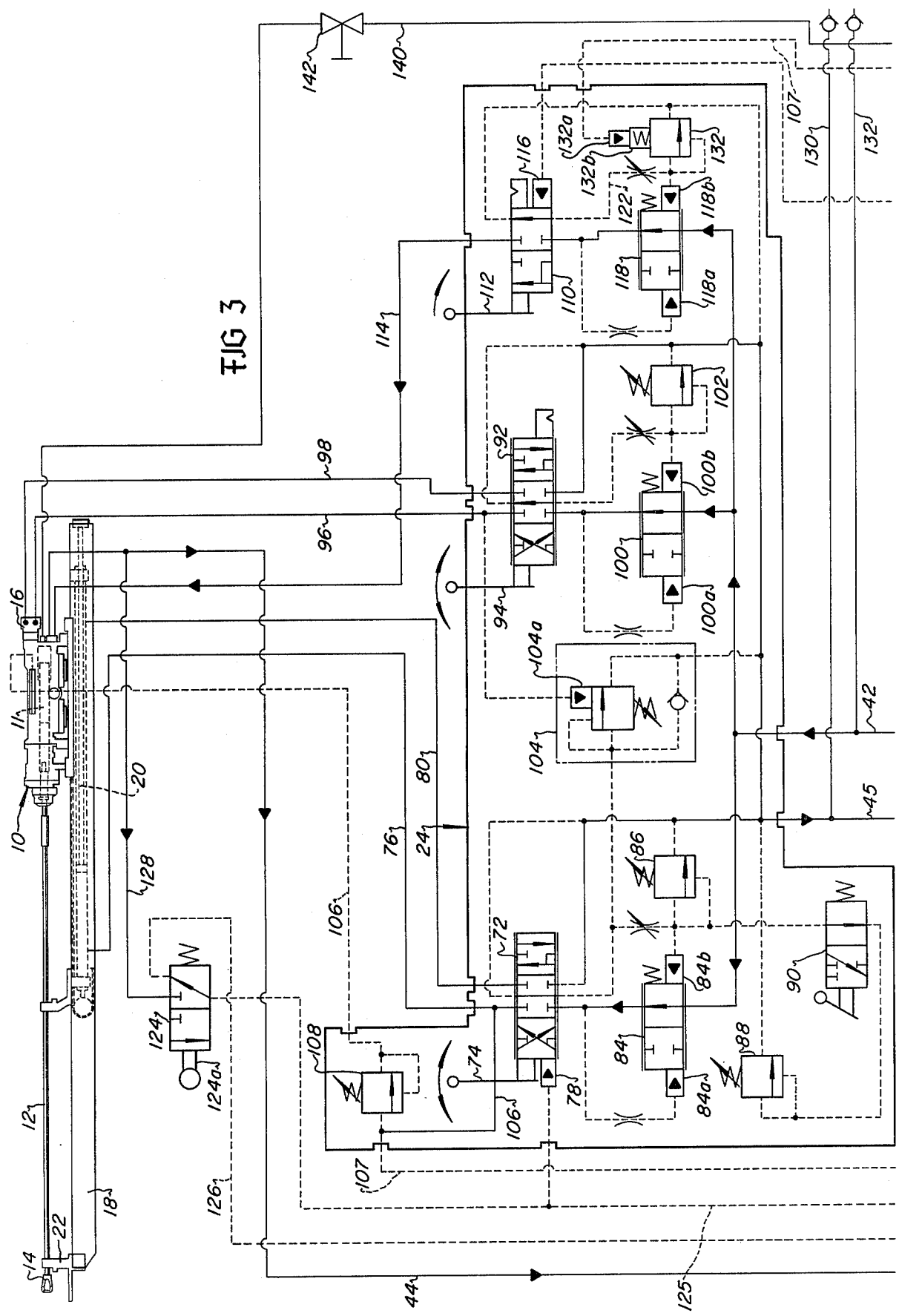
FIG. 3 is a portion of a schematic diagram of an alternate embodiment of the control system of the present invention.
Figure 4:
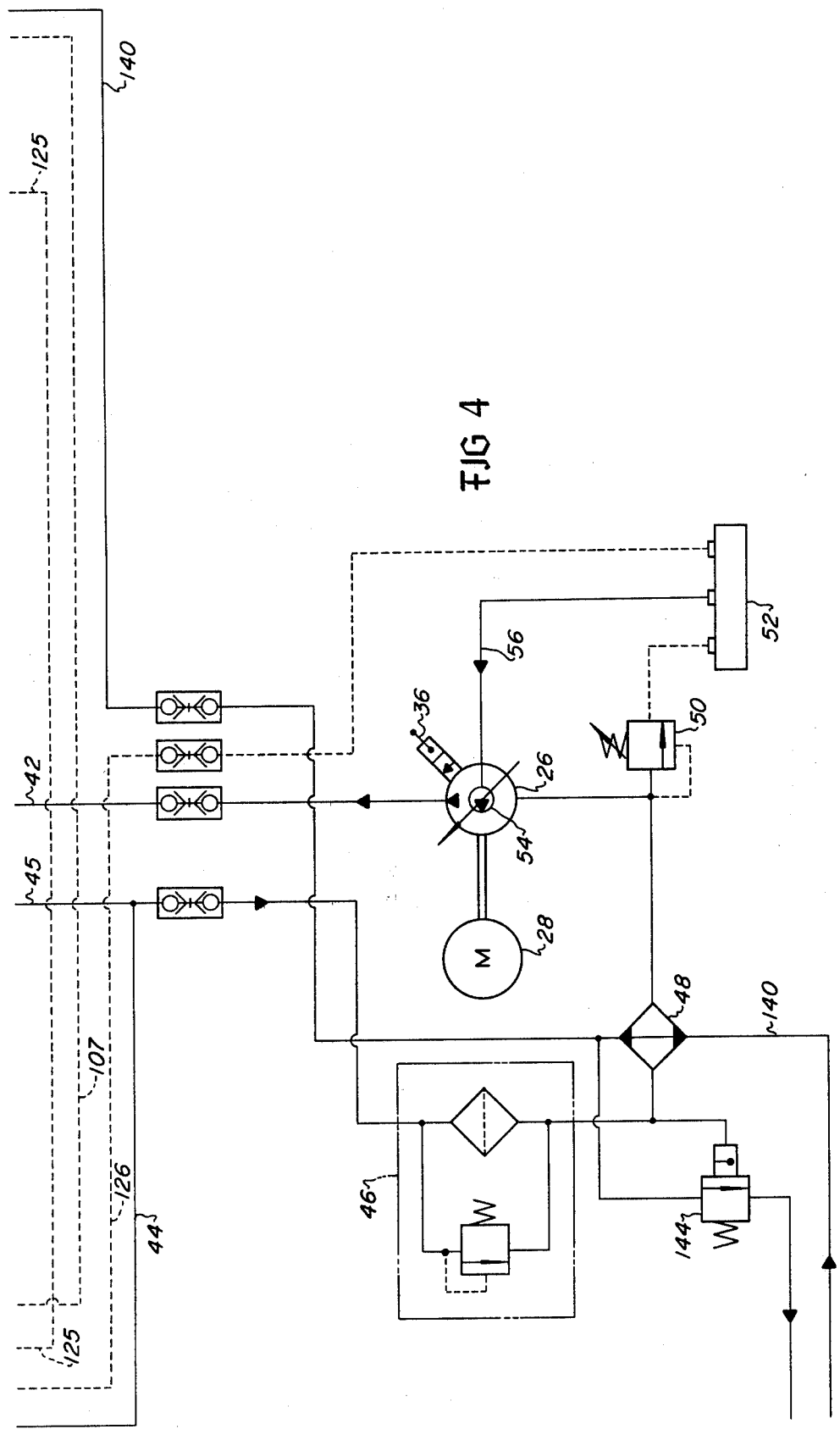
FIG. 4 is a further portion of the schematic diagram of the embodiment of FIG. 3; and, FIG. 5 is a diagram of the pressure and flow characteristic of the pump disclosed in FIGS. 2 and 4.

An alternate embodiment of the present invention is shown by the schematic diagrams of FIGS. 3 and 4 which are intended to be viewed together in the same manner as FIGS. 1 and 2. In the embodiment of FIGS. 3 and 4 the hydraulic cylinder actuator for actuating the pump displacement or flow volume control lever 36 is eliminated and the pump displacement control is normally set at maximum displacement. The control circuit of FIG. 3 is similar to FIG. 2 except that the pressure relief valve 120 for controlling the maximum fluid pressure to the drill percussion motor is replaced by an embodiment designated by the numeral 132. The relief valve 132 includes a pressure fluid actuator 132a operative to change the pressure relief setting of a mechanical spring actuator 132b for adjusting limiting pressure in the conduit 114 and acting on the pressure compensator control valve actuator 118b. The actuator 132a for the pressure relief valve 132 is adapted to receive a pressure fluid signal by way of the conduit 107 to control the setting of the spring actuator 132b. The pressure in conduit 76 is relatively high in the forward feed operating mode and, accordingly, the pressure in conduit 107 will cause the actuator 132a to set the spring actuator 132b at a high pressure relief setting. However, when the feed motor 20 is reversed the conduit 76 and conduit 107 are at low pressure and the pressure relief setting of valve 132 is reduced so that the drill percussion motor can be run only at reduced power if the drill operator actuates the valve 110 to the open position.

Moreover, the valve 132 may be adapted to operate in such a way that if the pressure in conduits 106 and 107 is reduced from automatic reduction of the flow thereto due to operation of the relief valve 104, or by manual operation of the valve 72 then the flow to the drill percussion motor may be reduced or shut off completely. Proportional reduction of flow to the drill percussion motor with reduced feed pressure is normally by necessary for most drilling conditions because the blow frequency control is also operative at reduced feed pressure to cause the drill percussion motor to operate at a progressively higher blow frequency and lower blow intensity. However, when the feed direction is reversed it is normally desirable to reduce or shut off completely the maximum fluid flow to the drill percussion motor.

The control for the pump 26 in the embodiment of FIG. 4 is set at maximum displacement with the automatic power limit feature in effect. If flow resistance in the system exceeds the maximum pump discharge pressure limit, the pump output flow is further reduced without any increase in pump discharge pressure. The pump 26 would then be operating at a point of the line 64 between points 60 and 66 on the diagram of FIG. 5. Accordingly, when the control system of FIGS. 3 and 4 operates in the reverse feed mode or when all of the control valves 72, 92 and 110 are in the shutoff position, the pump discharge pressure is the maximum setting but flow may be reduced to nil.

The control system shown in the drawings also includes drill hole flushing liquid controls for controlling the flow of flushing liquid such as water, to the drill stem 12. The flushing water may be used to cool the hydraulic fluid in the heat exchanger 48. The conduit 140 represents the water supply conduit which includes a manual control valve 142 for controlling the amount of flushing water being conducted to the drill stem. The flushing and cooling water circuit also includes a temperature responsive valve 144, FIGS. 2 and 4, which assures adequate water flow for cooling the hydraulic fluid regardless of the amount of water flowing to the drill stem.

What is claimed is:

1. In a hydraulic pressure fluid operated rock drill apparatus in combination:
   a percussion rock drill including a hydraulic pressure fluid actuated percussion motor for delivering repeated impact blows to a drill stem;
   a hydraulic pressure fluid operated drill stem rotation motor;

a feed bar for supporting said rock drill and a hydraulic pressure fluid operated feed motor for moving said rock drill back and forth along said feed bar;

a single variable displacement hydraulic pump; a main fluid supply conduit means adapted to receive pressure fluid from said pump and comprising a common source for supplying hydraulic pressure fluid to said percussion motor, said rotation motor, and said feed motor; and a control system for operating said rock drill apparatus comprising:

respective pairs of motor supply and return conduits connected to said percussion motor, said rotation motor, and said feed motor for supplying hydraulic pressure fluid to said motors from said main fluid supply conduit means;

a manually actuatable control valve connected to the supply conduit for said percussion motor for controlling the flow of pressure fluid to said percussion motor; and, manually actuated control valves connected to the respective pairs of feed motor and rotation motor supply and return conduits for controlling the flow of pressure fluid to said feed motor and said rotation motor and for reversing said feed motor and said rotation motor;

said control valves for controlling said feed motor and said rotation motor including respective pressure differential balancing valve means for maintaining a substantially constant pressure drop between said main supply conduit means and said feed motor and rotation motor supply conduits.

2. The invention set forth in claim 1 wherein:

said control system includes pressure differential balancing valve means for maintaining a substantially constant pressure drop between said main supply conduit means and said percussion motor supply conduit.

3. The invention set forth in claim 1 together with:

a proportional pressure control valve for controlling the fluid pressure in said feed motor supply conduit, said proportional pressure control valve being responsive to a pressure signal from said rotation motor supply conduit to reduce a fluid pressure signal acting on said pressure differential balancing valve means for said feed motor in proportion to an increase in the fluid pressure acting on said rotation motor above a predetermined limit.

4. The invention set forth in claim 1 wherein:

said pump includes control means for limiting the maximum pump discharge pressure.

5. The invention set forth in claim 4 wherein:

said control system includes means interposed in said main supply conduit means between said pump and said control valve for said percussion motor for reducing the supply of pressure fluid to said percussion motor in response to reversing said feed motor.

6. In a hydraulic pressure fluid operated rock drill apparatus in combination:

a percussion rock drill including a hydraulic pressure fluid actuated percussion motor for delivering repeated impact blows to a drill stem;

a hydraulic pressure fluid operated drill stem rotation motor;

a feed bar for supporting said rock drill and a hydraulic pressure fluid operated feed motor for moving said rock drill back and forth along said feed bar;

a single hydraulic pump for supplying hydraulic pressure fluid to said percussion motor, said rotation motor, and said feed motor; and a control system for operating said rock drill apparatus comprising:

respective pairs of motor supply and return conduits connected to said percussion motor, said rotation motor, and said feed motor for supplying hydraulic pressure fluid to said motors from main fluid supply conduit means connected to said pump;

a manually actuatable control valve connected to the supply conduit for said percussion motor for controlling the flow of pressure fluid to said percussion motor;

manually actuated control valves connected to the respective pairs of feed motor and rotation motor supply and return conduits for controlling the flow of pressure fluid to said feed motor and said rotation motor and for reversing said feed motor and said rotation motor;

said control valves for controlling said feed motor and said rotation motor including respective pressure differential balancing valve means for maintaining a substantially constant pressure drop between said main supply conduit means and said feed motor and rotation motor supply conduits; and control means for said pump operable to vary the maximum limiting fluid volume displacement of said pump and a pressure fluid operated servomechanism for causing said control means to vary said maximum limiting displacement of said pump between a low displacement setting and a high displacement setting.

7. The invention set forth in claim 6 wherein:

said servomechanism comprises a pressure fluid actuator responsive to a first pressure signal on starting said pump to operate said control means to limit the maximum displacement of said pump to a first displacement condition, said actuator being responsive to a second pressure signal from said feed motor supply conduit to cause said control means to increase said maximum displacement of said pump above said first displacement condition.

8. The invention set forth in claim 6 wherein:

said control means for said pump includes means for causing said pump to deliver pressure fluid to said main supply conduit means at substantially constant output power by varying the output fluid flow and pressure within predetermined limits.

9. In a hydraulic pressure fluid operated rock drill apparatus in combination:

a percussion rock drill including a hydraulic pressure fluid actuated percussion motor for delivering repeated impact blows to a drill stem;

a hydraulic pressure fluid operated drill stem rotation motor;

a feed bar for supporting said rock drill and a hydraulic pressure fluid operated feed motor for moving said rock drill back and forth along said feed bar;

a single hydraulic pump for supplying hydraulic pressure fluid to said percussion motor, said rotation motor, and said feed motor; and a control system for operating said rock drill apparatus comprising:

respective pairs of motor supply and return conduits connected to said percussion motor, said rotation motor, and said feed motor for supplying hydraulic pressure fluid to said motors from main fluid supply conduit means connected to said pump;

a manually actuatable control valve connected to the supply conduit for said percussion motor for controlling the flow of pressure fluid to said percussion motor;

manually actuated control valves connected to the respective pairs of feed motor and rotation motor supply and return conduits for controlling the flow of pressure fluid to said feed motor and said rotation motor and for reversing said feed motor and said rotation motor;

said control valves for controlling said feed motor and said rotation motor including respective pressure differential balancing valve means for maintaining a substantially constant pressure drop between said main supply conduit means and said feed motor and rotation supply conduits;

a first pressure relief valve set to normally limit the fluid pressure to said feed motor to a first predetermined pressure and a second pressure relief valve set to limit the fluid pressure to said feed motor to a second predetermined pressure greater than said first predetermined pressure; and, means operable at will for causing only said second pressure relief valve to be operable to limit the fluid pressure to said feed motor.

10. In a hydraulic pressure fluid operated rock drill apparatus in combination:

a percussion rock drill including a hydraulic pressure fluid actuated percussion motor for delivering repeated impact blows to a drill stem;

a hydraulic pressure fluid operated drill stem rotation motor;

a feed bar for supporting said rock drill and a hydraulic pressure fluid operated feed motor for moving said rock drill back and forth along said feed bar;

a single hydraulic pump for supplying hydraulic pressure fluid to said percussion motor, said rotation motor, and said feed motor; and a control system for operating said rock drill apparatus comprising:

respective pairs of motor supply and return conduits connected to said percussion motor, said rotation motor, and said feed motor for supplying hydraulic pressure fluid to said motors from main fluid supply conduit means connected to said pump;

a manually actuatable control valve connected to the supply conduit for said percussion motor for controlling the flow of pressure fluid to said percussion motor;

manually actuated control valves connected to the respective pairs of feed motor and rotation motor supply and return conduits for controlling the flow of pressure fluid to said feed motor and said rotation motor and for reversing said feed motor and said rotation motor;

said control valves for controlling said feed motor and said rotation motor including respective pressure differential balancing valve means for maintaining a substantially constant pressure drop between said main supply conduit means and said feed motor and rotation motor supply conduits;

a proportional pressure control valve for controlling the fluid pressure in said feed motor supply conduit, said proportional pressure control valve being responsive to a pressure signal from said rotation motor supply conduit to reduce the fluid pressure to said feed motor in proportion to an increase in the fluid pressure acting on said rotation motor above a predetermined limit; and, control means for varying the percussion blow frequency and intensity of said percussion motor, said control means being responsive to decreasing fluid pressure in said feed motor supply conduit to cause the percussion blow frequency to increase and blow intensity to decrease.

11. The invention set forth in claim 10 wherein:

said control means for varying the percussion blow frequency includes a pressure regulating valve interposed in a control signal conduit for regulating a pressure fluid signal therein, said control signal conduit being in communication with said feed motor supply conduit for the forward feed operating condition which supply conduit is operable to conduct pressure fluid from said feed motor in the reverse feed operating condition of said feed motor.

12. In a hydraulic pressure fluid operated rock drill apparatus in combination:

a percussion rock drill including a hydraulic pressure fluid actuated percussion motor for delivering repeated impact blows to a drill stem;

a hydraulic pressure fluid operated drill stem rotation motor;

a feed bar for supporting said rock drill and a hydraulic pressure fluid operated feed motor for moving said rock drill back and forth along said feed bar;

a single variable displacement hydraulic pump with control means for limiting the maximum pump discharge pressure for supplying hydraulic pressure fluid to said percussion motor, said rotation motor, and said feed motor; and a control system for operating said rock drill apparatus comprising:

respective pairs of motor supply and return conduits connected to said percussion motor, said rotation motor, and said feed motor for supplying hydraulic pressure fluid to said motors from main fluid supply conduit means connected to said pump;

a manually actuatable control valve connected to the supply conduit for said percussion motor for controlling the flow of pressure fluid to said percussion motor;

manually actuated control valves connected to the respective pairs of feed motor and rotation motor supply and return conduits for controlling the flow of pressure fluid to said feed motor and said rotation motor and for reversing said feed motor and said rotation motor;

said control valves for controlling said feed motor and said rotation motor including respective pressure differential balancing valve means for maintaining a substantially constant pressure drop between said main supply conduit means and said feed motor and rotation motor supply conduits;

a pressure differential balancing valve interposed in said main supply conduit means between said pump and said control valve for said percussion motor for reducing the supply of pressure fluid to said percussion motor in response to reversing said feed motor; and, a pressure relief valve for controlling a pressure fluid signal acting on said pressure differential balancing valve.

13. The invention set forth in claim 12 wherein:

said pressure relief valve includes a spring actuator and a fluid pressure responsive actuator for changing the limit pressure setting of said spring actuator in response to a pressure fluid signal caused by the reversing of said feed motor.

14. In a hydraulic pressure fluid operated rock drill apparatus in combination:
- a percussion rock drill including a hydraulic pressure fluid actuated percussion motor for delivering repeated impact blows to a drill stem, said rock drill including percussion blow frequency control mechanism responsive to a pressure fluid signal applied thereto for changing the blow frequency of said percussion motor;
- a hydraulic pressure fluid operated drill stem rotation motor;
- a feed bar for supporting said rock drill and a hydraulic pressure fluid operated feed motor for moving said rock drill back and forth along said feed bar;
- variable displacement pump means for supplying hydraulic pressure fluid to said percussion motor, said rotation motor, and said feed motor; and a control system for operating said rock drill apparatus comprising:
- respective pairs of motor supply and return conduits connected to said rotation motor and said feed motor for supplying hydraulic pressure fluid to said motors;
- control valves connected to the respective pairs of motor supply and return conduits for said feed motor and said rotation motor for controlling the flow of pressure fluid to said feed motor and said rotation motor and for reversing said feed motor and said rotation motor, said control valves including respective pressure differential balancing valve means for maintaining a substantially constant pressure drop between main supply conduit means and said motor supply conduits; and,
- control means for varing the pressure fluid signal applied to said blow frequency control mechanism in relation to a change in the fluid pressure acting on said feed motor so as to increase the percussion blow frequency of said percussion motor when the feed pressure, while feeding said rock drill toward a work face, is reduced.

15. The invention set forth in claim 14 wherein:
said control means for varying the percussion blow frequency includes a pressure regulating valve interposed in a control signal conduit for regulating a pressure fluid signal therein, said control signal conduit being in communication with said feed motor supply conduit.

16. The invention set forth in claim 15 together with:
a proportional pressure control valve for controlling the fluid pressure in said feed motor supply conduit, said proportional pressure control valve being responsive to a pressure signal from said rotation motor supply conduit to reduce the fluid pressure to said feed motor in proportion to an increase in the fluid pressure acting on said rotation motor above a predetermined limit.

17. In a hydraulic pressure fluid operated rock drill apparatus in combination:
- a percussion rock drill including a hydraulic pressure fluid actuated percussion motor for delivering repeated impact blows to a drill stem;
- a hydraulic pressure fluid operated drill stem rotation motor;
- a feed bar for supporting said rock drill and a hydraulic pressure fluid operated feed motor for moving said rock drill back and forth along said feed bar;
- a single variable displacement hydraulic pump, a main fluid supply conduit means adapted to receive pressure fluid from said pump and comprising a common source for supplying hydraulic pressure fluid to said percussion motor, said rotation motor, and said feed motor; and a control system for operating said rock drill apparatus comprising:
- respective pairs of motor supply and return conduits connected to said percussion motor, said rotation motor, and said feed motor for supplying hydraulic pressure fluid to said motors from said main fluid supply conduit means;
- a manually actuatable control valve connected to the supply conduit for said percussion motor for controlling the flow of pressure fluid to said percussion motor; and,
- manually actuated control valves connected to the respective pairs of feed motor and rotation motor supply and return conduits for controlling the flow of pressure fluid to said feed motor and said rotation motor and for reversing said feed motor and said rotation motor;
- said control valve for controlling said rotation motor including pressure differential balancing valve means for maintaining a substantially constant pressure drop between said main supply conduit means and said rotation motor supply conduits.

* * * * *